United States Patent [19]

Sobolev et al.

[11] 4,113,019
[45] Sep. 12, 1978

[54] INERT GAS GENERATOR BASED ON AIR JET ENGINE

[76] Inventors: Georgy Georgievich Sobolev, ulitsa Schepkina, 47/3, kv. 64, Moscow; Anatoly Ivanovich Kozljuk, ulitsa Postysheva, 135, kv. 46, Donetsk; Mikhail Vasilievich Kolyshenko, ulitsa Artema, 161, kv. 6, Donetsk; Valery Leonidovich Makarenko, ulitsa Baikova, 30, kv. 2, Donetsk; Valentin Vasilievich Vasilenko, ulitsa Levitskogo, 23, kv. 2, Donetsk; Leonid Denisovich Vishnevsky, ulitsa Levitskogo, 27, kv. 8, Donetsk; Viktor Ivanovich Kukhno, ulitsa M. Ulyanovoi, 53, kv. 30, Donetsk, all of U.S.S.R.

[21] Appl. No.: 679,437

[22] Filed: Apr. 22, 1976

[30] Foreign Application Priority Data

Aug. 13, 1975 [SU] U.S.S.R. .......................... 2157152[I]

[51] Int. Cl.$^2$ ............................................. A62C 35/36
[52] U.S. Cl. ................................. 169/12; 239/265.17
[58] Field of Search ............... 169/12, 11; 239/265.17, 239/265.39; 62/121, 269

[56] References Cited

U.S. PATENT DOCUMENTS

| | | |
|---|---|---|
| 2,581,353 | 1/1952 | Bonvillian et al. ............ 239/553.5 X |
| 2,961,050 | 11/1960 | MacCracken ........................ 169/12 |
| 3,000,177 | 9/1961 | Logerot et al. ................. 239/265.17 |
| 3,374,954 | 3/1968 | Card ............................. 239/265.17 X |
| 3,438,445 | 4/1969 | MacCracken ..................... 169/12 X |
| 3,768,272 | 10/1973 | Barrett .............................. 62/64 X |
| 3,786,992 | 1/1974 | Robinson ....................... 239/265.39 |

FOREIGN PATENT DOCUMENTS 908,890 10/1962 United Kingdom ...................... 169/12

*Primary Examiner*—Joseph F. Peters, Jr.
*Assistant Examiner*—Michael Mar
*Attorney, Agent, or Firm*—Lackenbach, Lilling & Siegel

[57] ABSTRACT

Installed at the outlet of the afterburning chamber is a diffuser whose narrow section forms a base for the afterburning chamber. The joint between the afterburning chamber and the diffuser is enclosed by a depression chamber which has a manifold with a circular slot for admitting compressed inert gas, e.g. nitrogen, from the outside. The diffuser accommodates a nozzle for feeding freon into the discharged gas flow. This increases the capacity, head and fire-fighting efficiency of the generator.

5 Claims, 1 Drawing Figure

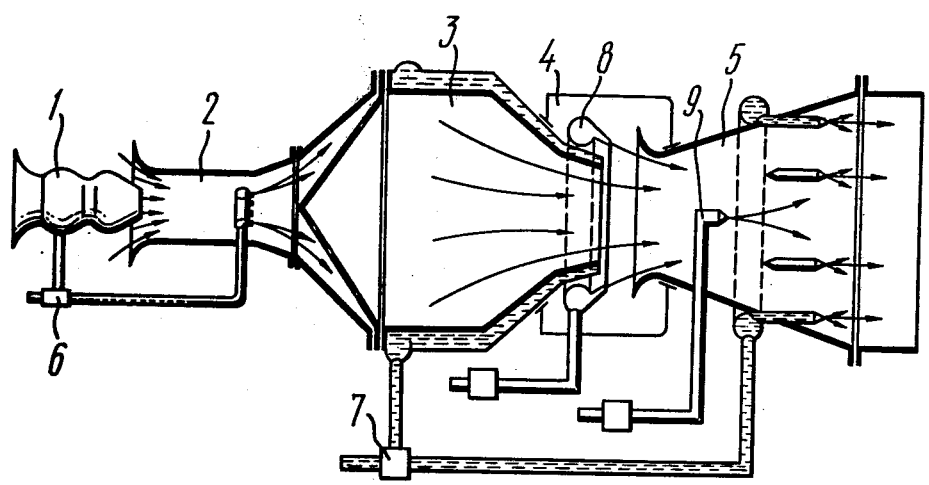

INERT GAS GENERATOR BASED ON AIR JET ENGINE

The present invention relates to fire-fighting equipment and more particularly it relates to installations for extinguishing fires with inert gas and can be used in putting out underground fires and preventing explosions in wells and mines.

Known in the art is an inert gas generator comprising an air jet engine, an ejector channel, an afterburning chamber, and fuel and water supply systems (see, for example, Pat. No. 908890, Cl. 47A6, Great Britain).

Such a generator extinguishes fires with a moistened gas flow having a low oxygen content (reduced to 7%). The content of oxygen is reduced by burning an additional quantity of the fuel and moistening the gas flow. However, when the moistened flow is forced into underground workings, the water vapours become condensed and the percentage of oxygen in the flow grows to 12%. The gas flow with this oxygen percentage cannot be used for putting out fires and preventing explosions of methane-air mixtures in mines.

This disadvantage had been eliminated in the inert gas generator covered by the Author's Certificate No. 315761, Cl. 5d5/00, E21/5/00, USSR, and comprising an air jet engine, an ejector channel, an afterburning chamber and the fuel and water supply systems owing to the fact that the afterburning chamber is provided with a cone-shaped grating.

In the process of feeding a vapour-gas mixture into under-ground workings there arises a hydraulic and thermal resistance which opposes the head built up by the generator and decreases its output.

Besides, the low head characteristic of this generator prevents the use of dense insert gases in the vapour-gas mixture, e.g. freon, over long distances to the centre of the fire.

An object of the present invention is to provide an inert gas generator based on an air jet engine which would increase output and working capacity in extinguishing fires with a jet of inert gas, in blowing into closed spaces and channels and in other applications.

Another object of the present invention is to provide an inert gas generator with a higher head of inert gas flow thus increasing the efficiency of said generator for fire-fighting work, extending the effective fire-fighting zone and speeding up the fire-fighting and other processes.

Still another object of the invention is to provide a fire-fighting installation based on an air jet engine which would be adapted for convenient control of its output performance to suit the actual service conditions.

And a further object of the present invention is to provide a highly efficient inert gas generator wherein its operational characteristics would be improved by simple and comparatively cheap alterations in design.

The objects of the present invention are accomplished by providing an inert gas generator based on an air jet engine comprising the following units installed successively at the engine outlet: an ejector channel, an afterburning chamber, a system of fuel supply to the engine and to the afterburning chamber and a water supply system for cooling said chamber and the produced gas flow; this generator is characterized in that it has a diffuser installed at a certain distance from the outlet of said afterburning chamber, and directed to it by its narrow section, the space around the joint between the diffuser and the afterburning chamber being enclosed by a housing which forms a depression chamber.

Such a solution increases the head of the inert gas flow at the diffuser outlet thus improving the anti-fire capabilities of the generator according to the invention.

According to one of the embodiments of the present invention the inert gas generator is characterized in that the depression chamber has a manifold with a circular slot for admitting compressed inert gas, e.g. nitrogen, from the outside.

This structural improvement increases the efficiency of fire extingushing due to the supply of additional portions of nitrogen into the depression chamber.

According to another embodiment of the present invention the inert gas generator is characterized in that its anti-fire efficiency is increased by providing the diffuser in the depression chamber with a nozzle intended to feed freon into the jet of the discharged gas.

These technical improvements increase the anti-fire efficiency of the produced inert gas jet which is particularly important in difficult cases of underground fires.

The accompanying drawing gives a sectionalized general view of the inert gas generator according to the invention.

The generator consists of an air jet engine 1, an ejector channel 2, an afterburning chamber 3 with a grating at the inlet and a depression chamber 4 with a diffuser 5 at the outlet, a fuel supply system 6 and a water supply system 7.

The depression chamber accommodates a manifold 8 with a circular slot and the diffuser 5 accommodates a nozzle 9 for the delivery of freon.

The generator functions as follows. The exhaust gases of the air jet engine are discharged into the ejector channel 2, draw in the air from outside and are mixed with it. This forms a gas-air-mixture which is then mixed with a liquid fuel, e.g. kerosene supplied by the system 6.

The fuel evaporates in the gas-air mixture, mixes with it and enters the afterburning chamber 3.

Here, the fuel-air mixture burns up and forms an inert gas with a low content of oxygen.

The products of combustion flow through the narrowing jet nozzle of the afterburning chamber into the diffuser 5 which is fed with a jet of compressed inert gas, e.g. nitrogen, from the manifold 8 with a circular slot.

The ejecting effect of the jet of combustion products and of the stream of inert gas creates a low-pressure zone in the depression chamber 4 which limits the access of the outside air into the flow of combustion products.

A reduction in the pressure of the medium receiving the products of combustion from the afterburning chamber brings about an increase in the velocity head of the gas flow and of the rate of air flow through the generator. As a result, there appear stable critical conditions of gas flow in the exit section of the afterburning chamber nozzle.

Under the existing pressures of gas at the afterburning chamber inlet (1.15–1.2 barometric pressure) only the use of the depression chamber 4 makes it possible to ensure critical conditions of gas flow in the nozzle of the afferburning chamber 3.

Under these conditions the external counterpressure of the underground workings which are filled with the vapour-gas mixture exerts no influence on the operation of the air blower and on the processes of fuel combustion and, therefore, does not decrease the flow rate and head characteristics of the generator.

These operating conditions of the generator can be maintained in a wide range of counterpressures (0–700 kgf/m$^2$) by controlling the flow rate (from 0.5 to 1.0 m$^3$/s) of the inert gas jet discharged from the manifold 8 into the diffuser 5. Simultaneously the diffuser is fed with freon from the nozzle 9, said freon being carried towards the centre of fire by the kinetic energy of the jet of inert gases.

We claim:

1. An inert gas generator for extinguishing fires comprising:
an air jet engine with fuel supply means adapted to produce exhaust gases; said air jet engine communicating with an ejector channel with fuel supply means, and adapted to draw in outside air; said ejector channel communicating with an afterburning chamber with cooling means and means for supplying an inert gas; said afterburning chamber communicating with a low pressure depression chamber adapted to limit access of outside air into the flow of said gases; said depression chamber communicating with manifold means for supplying an inert gas to the gas flow; said manifold means communicating with a diffuser with means for feeding halogenated hydrocarbons into the gas flow which exits at high velocity.

2. The inert gas generator of claim 1 wherein said fuel supply means are adapted to supply fuel to the engine and afterburning chamber in amounts which insure substantially complete combustion.

3. The gas generator of claim 1 wherein the afterburning chamber cooling means is in the form of a water cooled jacket.

4. The inert gas generator of claim 1 wherein the inert gas manifold means includes circular slots mounted near the outlet of the depression chamber for admission of compressed inert gas.

5. A generator according to claim 1 wherein the diffuser of the depression chamber has a nozzle intended to feed freon into the jet of the discharged gas.

* * * * *